Figure 1:
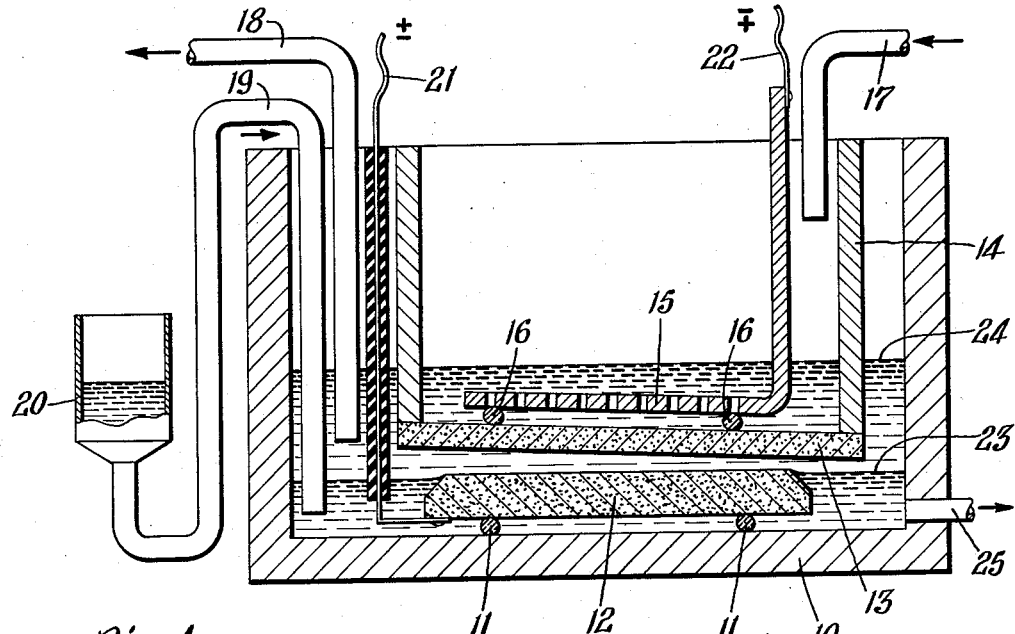

Sept. 16, 1947.  N. M. WINSLOW ET AL  2,427,433

ELECTROLYTIC PROCESSES

Filed April 29, 1944

INVENTORS
NATHANIEL M. WINSLOW
GEORGE W. HEISE
BY
ATTORNEY

Patented Sept. 16, 1947

2,427,433

UNITED STATES PATENT OFFICE

2,427,433

ELECTROLYTIC PROCESSES

Nathaniel M. Winslow, Lakewood, and George W. Heise, Rocky River, Ohio, assignors to National Carbon Company, Inc., a corporation of New York Application April 29, 1944, Serial No. 533,320

6 Claims. (Cl. 204—74)

1

The invention is a method of conducting organic chemical reactions under the influence of electrolytic anodic or cathodic effects.

A wide variety of organic liquids (including molten materials) will act as depolarizers at an electrolytic anode or cathode or both. The type of reaction accompanying the depolarization may in many instances be controlled and varied, as by a change in the applied voltage or in the composition of the electrode. These circumstances make the use of electrolytic methods in organic synthesis commercially attractive; but practical difficulties strictly limit their commercial use. With but few notable exceptions, organic electrolytic processes are characterized by low current densities, poor yields, and low efficiency in the use of both current and materials.

In large measure, these difficulties could be avoided if a conducting solution, i. e., an electrolyte, capable of dissolving substantial amounts of organic compounds were available. However, most organic compounds are insoluble or only slightly soluble in good ionizing solvents, are themselves nonconductors even if liquid, are not ionizable even when soluble in an ionizing solvent, and do not act as ionizing solvents even when an ionizable solute can be dissolved. It is thus difficult to bring to the depolarizing region enough organic depolarizer to utilize a large amount of electric current without using an electrolyte of poor conductivity or, with a good electrolyte, so far insulating the electrode from the electrolyte that the electrode ceases to act in its desired role. Vigorous agitation is customary, and it has been proposed to use electrodes of metal gauze, metal wool, and compressed metal or graphite powder to improve the conditions in the depolarizing region. It has also been proposed to use a hollow, porous, fluid-permeable graphite or metal electrode, and to force the organic liquid through the electrode by pressure. Such expedients, as well as others which have been proposed from time to time, provide a useful improvement under some conditions; but they are short of being a complete solution of the problem.

The method of the present invention employs a uniformly porous, electrically conductive, rigid electrode horizontally disposed between and in contact with both an organic liquid and an aqueous electrolyte. An impressed electromotive force is applied to the electrode, and an organic liquid or molten organic solid is fed to the depolarizing region solely by a capillary or "wick" action through the body of the porous electrode, without the aid of gravity or pressure. Removal of the depolarizer from the active surface of the electrode is only by conversion to reaction products. Because wick action alone is employed for feeding depolarizer to the reaction zone, the depolarizer can reach the active zone only at a rate equal to the rate at which it is removed. As a corollary, conversion of depolarizer when it is fed solely by wick action is 100%. Perhaps a reason for this result is that there is no danger of overflow even though the capillary distance through which the depolarizing liquid moves is small. For example, Kimball's College Physics, 3d edition, page 171, sec. 262, states: "A liquid cannot rise and overflow the top of a capillary tube however short it may be * * *." When wicking or capillary distance is very small, the liquid may reach the active surface of the electrode and not overflow, although the pores or capillaries may not all be of the same size. Thus, the nature of wick action feeding is such that there may be no excess flow of depolarizer to the active surface of the electrode and no excess of depolarizer on the electrode surface. The organic liquid depolarizer and the electrolyte, having different specific gravities, form an interface. Flooding of the active surface of the porous electrode with depolarizer is avoided by maintaining this active surface just slightly beyond the interface in the direction of the electrolyte. Flooding of the surface with electrolyte is avoided because of the preferential wetting of the electrodes by depolarizer.

Figure 2:
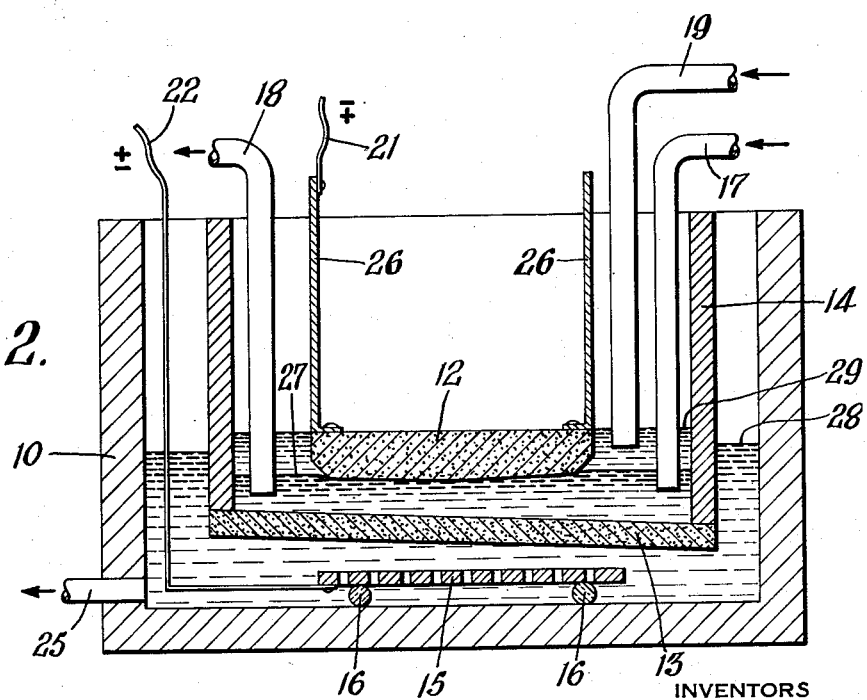

In the drawing:

Fig. 1 is a representation in vertical section of an electrolytic cell suitable for the practice of the invention having a wicking electrode at the bottom; and Fig. 2 is similar to Fig. 1 but illustrates an arrangement wherein a wicking electrode is placed at the top of a cell.

The porous, wicking electrode may be of carbon or graphite or metal, or of a mixture of metal with carbon or graphite or ceramic material, and may comprise a porous body of carbon, graphite, or ceramic material impregnated or coated with metal or conductive oxide. Uniformly porous electrodes having a multiplicity of minute interconnecting channels each having a length several times its diameter may be prepared according to United States Patent No. 1,988,478, B. E. Broadwell and L. C. Werking. To be operative the electrode material must be preferentially wet by the organic liquid. Not all electrode materials will readily be wet by all organic liquids, nor will all electrodes have potential and catalytic effects suited to any desired reaction; but the proper electrode material can be selected by trial from among the various known materials.

In practicing the invention, the electrode at which a desired reaction is to be carried out is placed in an electrolytic cell in contact with a suitable aqueous electrolyte. The electrode is disposed in a generally horizontal position, but in some instances, for example when it is located near the top of the cell, may be beveled slightly to prevent gas accumulation on its active surface. Provision is made for introducing an organic liquid depolarizer to the electrode. If the organic liquid to be used for a particular reaction has a specific gravity higher than that of the electrolyte, the electrode is placed near the bottom of the electrolytic cell, and the liquid reactant is delivered to the electrode from the side or from below it, so that gravity will not force the flow of the organic liquid. If the chosen reactant has a specific gravity lower than that of the electrolyte, the electrode is placed near the top of the cell, and the reactant is delivered to the electrode from the side or from above. In either case, the organic liquid depolarizer is distributed to the entire active surface of the electrode solely by wick action, without the aid of gravity or pressure. The active surface of the wicking electrode should be flat as shown in the drawing and substantially parallel to the interface. The distance between the interface and active surface is small enough to supply the entire active surface of the electrode with organic liquid by capillarity without overflowing. The term "uniformly porous" has reference to materials which have a great number of evenly distributed pores.

Depending on the materials used, the products of reaction may be soluble in the electrolyte or soluble in the depolarizer. If they are soluble in the electrolyte, electrolyte may be removed from the cell by decantation or by siphoning. If the reaction products are soluble in the depolarizer, continued operation depends on back diffusion of the reaction products from the active surface of the porous electrode to the supply of depolarizer in the cell. The reaction products in this case may be removed by interrupting operation and removing and replacing product-saturated depolarizer or by recycling depolarizer continuously.

A suitable cell for the electrolysis of organic liquids having a specific gravity greater than that of the electrolyte to yield products soluble in electrolyte is illustrated in Fig. 1 of the drawing. At the bottom of a cell container 10, resting on and separated from the bottom of the container 10 by supports 11, a porous electrode 12 is horizontally disposed. A porous diaphragm 13, suitably composed of a ceramic material is secured to a support 14 which divides the container 10 into separate compartments, the diaphragm 13 being placed above the porous electrode 12 and tilted at a slight angle from the horizontal to prevent the accumulation of gas on its surface. A second electrode 15 is placed above the diaphragm 13. This electrode 15 is preferably perforated. It may be composed of any material inert to the electrolyte. When a sulfuric acid electrolyte is used for example, the nonporous electrode may be composed of lead, but of course lead would not be satisfactory in chloride electrolytes. It rests on supports 16 which separate it from the diaphragm 13. For supplying electrolyte to the container 10, a conduit 17 is provided, while for removing electrolyte and reaction products there is a siphon 18 extending into the container 10 above the level of the top face of the porous electrode 12. A siphon 19 for delivering depolarizer to the container 10 from a reservoir 20 preferably has its delivery end in the container 10 just below the level of the top of the porous electrode 12. Leads 21, 22 are provided for connecting the electrodes 12, 15 to a source of electric current not shown.

In operating the cell illustrated in Fig. 1, the porous electrode 12 is made anode or cathode depending on whether oxidation or reduction of an organic liquid is desired. For reduction, the porous electrode 12 is made cathode. The organic liquid to be reduced is fed from the reservoir 20 through the siphon 19 to the container 10 to a level 23 just below the upper surface of the porous electrode 12. Electrolyte is then admitted to the inner and outer compartments of the container 10 through the conduit 17 until a level 24 above the anode electrode 15 is obtained. The electrolyte, being lighter than the organic liquid floats on it, and an interface between the two liquids is formed at the level 23 of organic liquid. Sufficient organic liquid is supplied during operation of the cell to maintain this interface just below the level of the upper surface of the porous electrode 12. Where the active surface of the electrode is parallel to the interface their separation should be small enough to supply the entire active surface of the electrode with the organic liquid by wicking or capillarity, without overflowing. By maintaining the interface at such a level, organic liquid is continuously supplied to the upper, active surface of the porous electrode 12 solely by wick action through its pores, and flooding of the active surface with organic liquid is avoided. At all times the porous electrode 12 is in contact with a supply of organic liquid. By a depolarizing reaction, the organic liquid is reduced when an electric current is passed between the electrodes 12 and 15. The products of the reaction, dissolved in electrolyte, are withdrawn through the siphon 18. A drain 25 is provided for emptying the cell.

In Fig. 2 of the drawing there is illustrated a suitable arrangement for conducting electrolysis of organic liquids having a lower specific gravity than the electrolyte used to yield products soluble in the electrolyte. In this case, the porous electrode 12 is uppermost in the cell container 10, being placed within the compartment formed by the diaphragm 13 and diaphragm support 14, above the perforated electrode 15. The porous electrode 12 is supported by brackets 26. To prevent the accumulation of gas on the lower electrolytically active surface of the porous electrode 12, this surface may be tapered or beveled slightly. Any gas formed during operation is thus allowed to escape to the sides of the electrode 12.

The operation of the cell illustrated in Fig. 2 is substantially the same as the operation of the cell illustrated in Fig. 1. Electrolyte is admitted to the inner and outer compartments of the container 10 through the conduit 17, and organic liquid is fed to the inner compartment through the siphon 19, the quantities of electrolyte and organic liquid being regulated so as to form an interface 27 just above the lower surface of the porous electrode 12. The level 28 of the electrolyte in the outer compartment of the container 10 will be above the level of the interface 27 and below the level 29 of the organic liquid in the inner compartment, the levels 28 and 29 being dependent on the specific gravities of electrolyte and organic liquid. During operation only sufficient organic liquid is fed to the cell to maintain the interface 21 just above the upper surface of the porous electrode 12. The organic liquid is fed to the active lower surface of the porous electrode 12 solely by wick action through its pores.

In a particular application of the invention, nitrobenzene was reduced to p-aminophenol at a porous carbon cathode in a cell similar to that illustrated in Fig. 1. Nitrobenzene was supplied to the active surface of the cathode solely by wick action. An aqueous electrolyte containing sulfuric acid was employed, and a current yield of 27% was obtained using a current density of 43.2 amperes per square foot.

In another application of the invention, nitrobenzene was reduced at a porous cathode to aniline. In this case the electrolyte used was an aqueous solution of hydrochloric acid. A yield of 15% was obtained using a current density of 43.2 amperes per square foot.

In still other applications of the invention benzene was oxidized to maleic acid at a porous anode, and naphthalene was oxidized to phthalic acid at a porous anode. In each of these applications, depolarizer was supplied to the active surface of the electrode by wick action.

By means of the invention organic reactions may be carried out electrolytically in a continuous manner at high current densities and with good yields. As pointed out above, however, the results obtainable depend in large part on the selection of a suitable electrode material. We have found that in the continuous, electrolytic reduction of nitrobenzene good results are obtained if the cathode is composed of carbonaceous material of the kind commonly used as electrode material in air depolarized primary cells made in the manner described in United States Patent No. 2,010,608, E. A. Schumacher, V. C. Hamister, and G. W. Heise.

While particular examples have been given of the application of the invention to oxidation and reduction reactions, these examples are given by way of illustration merely, and the invention is not limited thereto or thereby. For example, it may be successfully utilized in electrolytic nitration and diazotization reactions.

This application is in part a continuation of our application Serial No. 321,044, filed February 27, 1940.

We claim:

1. In a method of effecting a reaction of the class consisting of electrolytic oxidation and electrolytic reduction of an organic compound substantially insoluble in, and having a specific gravity different from, a liquid aqueous electrolyte, which method comprises passing an electric current through an aqueous electrolyte between anode and cathode electrodes in an electrolytic cell and supplying said organic compound to the active surface of and through the electrode at which the desired reaction is to take place, whereby to depolarize said active surface and to cause said compound to be reacted, the improvement which comprises providing in said electrolytic cell a main body of said liquid aqueous electrolyte and said main body of organic liquid which is insoluble in and has a specific gravity different from that of the said electrolyte; maintaining said main body of electrolyte and said main body of organic liquid unmixed and at different levels in said cell, whereby to form an interface where the electrolyte and organic liquid are in contact with each other; disposing an active, uniformly porous electrode composed of a material preferentially wet by said organic liquid at said interface so that said active electrode has an active surface generally parallel to said interface positioned within the main body of said electrolyte and in contact with said electrolyte and a second surface positioned wholly within and in contact with said organic liquid; feeding said organic liquid and said electrolyte to the cell to maintain said interface spaced from the active surface of the electrode a distance small enough to supply the entire active surface of the electrode with organic liquid by capillarity without overflowing and to maintain said main body of electrolyte and said main body of organic liquid in an unmixed condition and to maintain the said positions of the said surfaces of the electrode with respect to the electrolyte and organic liquid; the supplying of said organic liquid to said active surface of said electrode being by wick action of said electrode material from the main body of organic liquid through the body of said electrode to said active surface as rapidly, and only as rapidly, as it is reacted.

2. In a method of effecting a reaction of the class consisting of electrolytic oxidation and electrolytic reduction of an electrically nonconductive organic compound substantially insoluble in, and having a specific gravity less than, a liquid aqueous electrolyte, which method comprises passing an electric current through said aqueous electrolyte between electrodes in an electrolytic cell and supplying said organic compound to the active surface of said one of said electrodes, whereby to depolarize said active surface and to cause said compound to be changed, the improvement which comprises providing in said electrolytic cell the main body of said liquid aqueous electrolyte and the main body of said organic liquid which is insoluble in and has a specific gravity less than that of the said electrolyte; maintaining said main body of electrolyte and said main body of organic liquid unmixed and at different levels in said cell, said main body of organic liquid being at a level above that of said main body of electrolyte, whereby to present an interface where said electrolyte and said organic liquid are in contact with each other; disposing an active, uniformly porous electrode composed of a material preferentially wet by said organic liquid at said interface so that said porous electrode has an active surface parallel to said interface and positioned within said main body of electrolyte and in contact with said electrolyte and a second surface positioned wholly within and in contact with said organic liquid; feeding said organic liquid and said electrolyte to the cell to maintain said interface spaced from the active surface of the electrode a distance small enough to supply the entire active surface with organic liquid by capillarity without overflowing and to maintain said main body of electrolyte and said main body of organic liquid in an unmixed condition and to maintain the said positions of the said surface of said porous electrode with respect to the electrolyte and organic liquid; the supplying organic liquid to said active surface of said porous electrode being by wick action of said electrode material from the main body of organic liquid through the body of said porous electrode without overflowing, whereby said organic liquid is supplied to said active surface as rapidly, and only as rapidly, as it is electrolytically changed.

3. In a method of effecting a reaction of the class consisting of electrolytic oxidation and electrolytic reduction of an electrically nonconductive organic compound substantially insoluble in, and having a specific gravity greater than a liquid aqueous electrolyte, which method comprises passing an electric current through said aqueous electrolyte between electrodes in an electrolytic cell and supplying said organic compound to the active surface of a porous electrode, whereby to depolarize said active surface and to cause said compound to be changed, the improvement which comprises providing in an electrolytic cell a main body of said liquid aqueous electrolyte and a main body of said organic liquid which is insoluble in and has a specific gravity greater than that of said electrolyte; maintaining said main body of electrolyte and said main body of organic liquid unmixed and at different levels in said cell, said main body of electrolyte having a level above that of said main body of organic liquid, whereby to present an interface where said electrolyte and said organic liquid are in contact with each other; disposing an active, uniformly porous electrode composed of a material preferentially wet by said organic liquid at said interface so that said porous electrode has an active surface parallel to said interface and positioned within said main body of electrolyte and in contact with said electrolyte and a second surface positioned wholly within and in contact with said organic liquid; feeding said organic liquid and said electrolyte to said cell to maintain said interface spaced from the active surface of the electrode a distance small enough to supply the entire active surface with organic liquid by capillarity without overflowing and to maintain said main body of electrolyte and said main body of organic liquid in an unmixed condition and to maintain the said positions of the said surfaces of said porous electrode with respect to said electrolyte and organic liquid; the supplying of organic liquid to said active surface of said porous electrode being by wick action of said electrode material from said main body of organic liquid through the body of said porous electrode without overflowing, whereby said organic liquid is supplied to said active surface as rapidly, and only as rapidly, as it is electrolytically changed.

4. In a method of effecting an electrolytic reduction type reaction of an electrically nonconductive organic compound substantially insoluble in, and having a specific gravity less than, a liquid aqueous electrolyte, which method comprises passing an electric current through said aqueous electrolyte between anode and cathode electrodes in an electrolytic cell and supplying said organic compound to the active surface of said cathode electrode, whereby to depolarize said active surface and to cause said compound to be reduced, the improvement which comprises providing in said electrolytic cell the main body of said liquid aqueous electrolyte and the main body of said organic liquid which is insoluble in and has a specific gravity less than that of said electrolyte; maintaining said main body of electrolyte and said main body of organic liquid unmixed and at different levels in said cell, said main body of electrolyte having a level below that of said organic liquid, whereby to present an interface where said electrolyte and said organic liquid are in contact with each other; disposing an active, uniformly porous cathode electrode composed of a material preferentially wet by said organic liquid at said interface so that said cathode electrode has an active surface generally parallel to said interface and positioned within said main body of electrolyte and in contact with said electrolyte and a second surface positioned wholly within and in contact with said organic liquid; feeding said organic liquid and said electrolyte to the cell to maintain said interface spaced from the active surface of the cathode a distance small enough to supply the entire active surface of the cathode with organic liquid by capillarity without overflowing and to maintain said main body of electrolyte and said main body of organic liquid in an unmixed condition and to maintain the said positions of the said surfaces of said cathode electrode with respect to the electrolyte and the organic liquid; the supplying of organic liquid to said active surface of said cathode electrode being by wick action of said electrode material from said main body of organic liquid through the body of said cathode electrode without overflowing; whereby said organic liquid is supplied to said active surface as rapidly, and only as rapidly, as it is reduced.

5. In a method of effecting an electrolytic reduction type reaction of an electrically nonconductive organic compound substantially insoluble in, and having a specific gravity greater than, a liquid aqueous electrolyte, which method comprises passing an electric current through said aqueous electrolyte between anode and cathode electrodes in an electrolytic cell and supplying said organic compound to the active surface of said cathode electrode, whereby to depolarize said active surface and to cause said compound to be reduced, the improvement which comprises providing in said electrolytic cell a main body of said liquid aqueous electrolyte and a main body of said organic liquid which is insoluble in and has a specific gravity greater than that of said electrolyte; maintaining said body of electrolyte and said main body of organic liquid unmixed and at different levels in said cell, said main body of electrolyte having a level above that of said main body of organic liquid, whereby to present an interface where said electrolyte and said organic liquid are in contact with each other; disposing an active, uniformly porous cathode electrode composed of a material preferentially wet by said organic liquid at said interface so that said cathode electrode has an active surface generally parallel to said interface and positioned within said main body of electrolyte and in contact with said electrolyte and a second surface positioned wholly within and in contact with said organic liquid; feeding said organic liquid and said electrolyte to said cell to maintain said interface spaced from the active surface of said cathode a distance small enough to supply the entire active surface with organic liquid by capillarity without overflowing and to maintain said body of electrolyte and said main body of organic liquid in an unmixed condition and to maintain the said positions of said surfaces of said cathode electrode with respect to said electrolyte and said organic liquid; the supplying of said organic liquid to said active surface of said cathode electrode being by wick action of said electrode material from said main body of organic liquid through the body of said cathode electrode without overflowing, whereby said organic liquid is supplied to said active surface as rapidly, and only as rapidly, as it is reduced.

6. In a method of effecting an electrolytic reduction of nitrobenzene, which method comprises passing an electric current through an aqueous electrolyte, in which nitrobenzene is insoluble and which has a specific gravity different from that of nitrobenzene, between anode and cathode electrodes in an electrolytic cell and supplying said nitrobenzene to the active surface of said cathode electrode, whereby to depolarize said active surface and to cause said nitrobenzene to be reduced, the improvement which comprises providing in an electrolytic cell the main body of said liquid aqueous electrolyte, in which nitrobenzene is insoluble and which has a specific gravity less than that of said nitrobenzene, and the main body of nitrobenzene; maintaining said main body of electrolyte and said main body of nitrobenzene unmixed and at different levels in said cell, said main body of electrolyte having a level above that of said main body of nitrobenzene, whereby to present an interface where said electrolyte and said nitrobenzene are in contact with each other; disposing an active, uniformly porous cathode electrode composed of a material preferentially wet by said nitrobenzene at said interface so that said cathode electrode has an active surface parallel to said interface and positioned within said main body of electrolyte and in contact with said electrolyte and a second surface positioned wholly within and in contact with said nitrobenzene; feeding said nitrobenzene and said electrolyte to said cell to maintain said interface spaced from the active surface of the cathode a distance small enough to supply the entire active surface with nitrobenzene by capillarity without overflowing and to maintain said main body of electrolyte and said main body of nitrobenzene in an unmixed condition and to maintain the said positions of the said surfaces of said cathode electrode with respect to said electrolyte and nitrobenzene; the supplying of nitrobenzene to said active surfaces of said cathode electrode being by wick action of said electrode material from said main body of nitrobenzene through the body of said cathode electrode without overflowing, whereby said nitrobenzene is supplied to said active surface as rapidly, and only as rapidly, as it is reduced.

NATHANIEL M. WINSLOW.
GEORGE W. HEISE.

REFERENCES CITED

The following references are of record in the file of this patent:

UNITED STATES PATENTS

| Number | Name | Date |
|---|---|---|
| 1,536,419 | Burwell | May 5, 1925 |
| 2,273,795 | Heise et al. | Feb. 17, 1942 |

OTHER REFERENCES

Transactions of the Electrochemical Society, volume 75 (1939), pages 147 through 166; article by Heise.

Transactions of the Electrochemical Society, volume 80 (1941), pages 121 through 131; article by Winslow.

Transactions of the Electrochemical Society, volume 61 (1932), pages 281 through 304; article by Brigham et al.